(12) United States Patent
Ide et al.

(10) Patent No.: US 6,206,450 B1
(45) Date of Patent: Mar. 27, 2001

(54) AUTOMOTIVE CONVERTIBLE TOP ATTACHING CONSTRUCTION

(75) Inventors: Kuniteru Ide; Mitsuhiro Kamo, both of Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 0 days.

(21) Appl. No.: 09/060,571

(22) Filed: Apr. 15, 1998

(30) Foreign Application Priority Data

Apr. 15, 1997 (JP) .................................................. 9-096303

(51) Int. Cl.$^7$ ........................................................ B60J 7/00
(52) U.S. Cl. ................. 296/107.09; 296/107.11; 296/107.16; 296/217
(58) Field of Search ......................... 296/107.09, 107.11, 296/107.15, 107.16, 121, 122, 217

(56) References Cited

U.S. PATENT DOCUMENTS 4,929,015 * 5/1990 Bauer .................................. 296/116

FOREIGN PATENT DOCUMENTS

| 33114 | * | 8/1928 | (FR) | ..................................... 296/219 |
| 943654 | * | 12/1963 | (GB) . | |
| 02151525 | | 6/1990 | (JP) . | |
| 404078722 | * | 3/1992 | (JP) | ..................................... 296/219 |
| 405058166 | * | 3/1993 | (JP) | ..................................... 296/219 |
| 2528252 | | 12/1996 | (JP) . | |

* cited by examiner

Primary Examiner—D. Glenn Dayoan
Assistant Examiner—Mickki D. Murray
(74) Attorney, Agent, or Firm—Alston & Bird LLP

(57) ABSTRACT

There is provided an automotive convertible top attaching construction in which a roof is opened, and an open portion is covered with a top cloth, characterized in that the front end portion of the top cloth 12 is mounted to a top fixing panel 15, a frame 16 supporting the top fixing panel 15 is pivotally mounted on both sides of the open portion rotatably in the longitudinal direction of vehicle body, and the top fixing panel 15 is mounted to the frame 16 rotatably with respect to the axis in the vehicle width direction. Therefore, the flattering of the top cloth 12 can be prevented when the top cloth 12 is open. Thereby, the entrance of wind into the folded top cloth can be prevented when a sun roof portion is open, and the appearance can be improved.

4 Claims, 10 Drawing Sheets

AUTOMOTIVE CONVERTIBLE TOP ATTACHING CONSTRUCTION

FIELD OF THE INVENTION AND RELATED ART STATEMENT

The present invention relates to a motor vehicle in which an open portion is configured by being divided into a sun roof portion on the side of passenger compartment and a deck portion on the side of luggage compartment and, more particularly, to an automotive convertible top attaching construction such that a top fixing panel supporting the tip end of top can be moved with the upper surface thereof facing upward when a top disposed at the sun roof portion is open.

Conventionally, on some convertible automobiles in which a roof portion on the side of passenger compartment and an upper portion of the luggage compartment are open and this open portion is covered with a convertible top, the roof portion on the side of passenger compartment and the upper portion on the luggage compartment are covered with one convertible top collectively.

Figure 11:
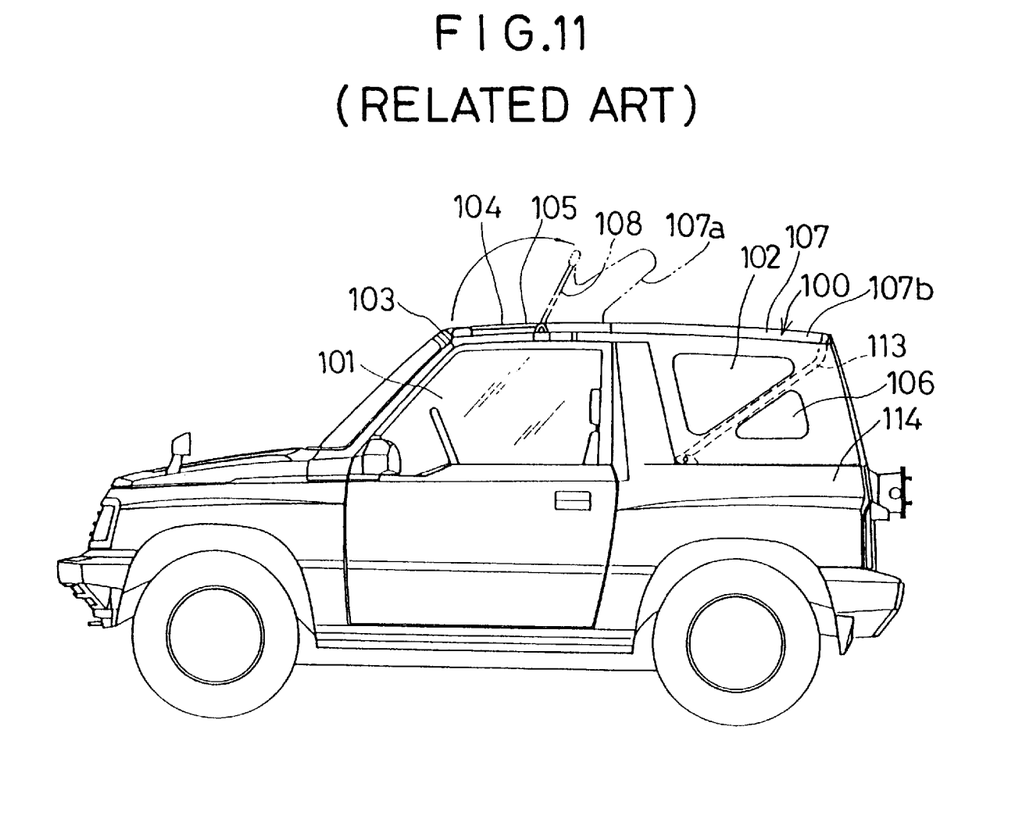
FIG. 11 is a side view showing a conventional automotive convertible top attaching construction.
Figure 12:
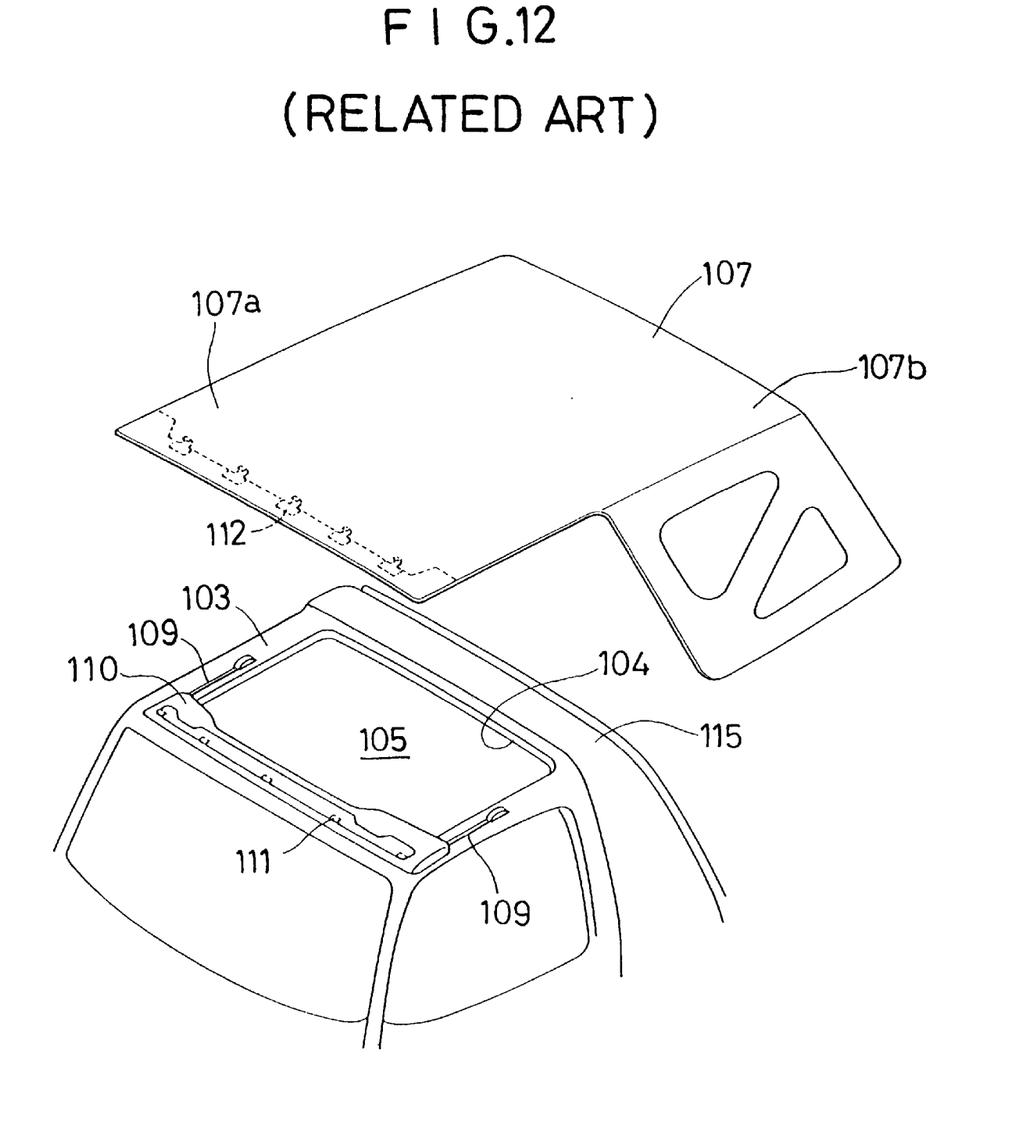
FIG. 12 is a perspective view showing a conventional automotive convertible top attaching construction shown in FIG. 11 with a top cloth being removed.

FIGS. 11 and 12 show a convertible automobile of this type.

This convertible automobile 100 is provided with a passenger compartment 101 at the front part of vehicle body and a luggage compartment 102 at the rear part thereof.

An opening portion 104 is provided at a roof portion 103 of the passenger compartment 101, thereby forming a sun roof portion 105.

On this convertible automobile 100, the sun roof portion 105 of the passenger compartment 101 and a deck portion 106 of the luggage compartment 102 are covered with one convertible top 107 collectively.

This top 107 is made up of a front top 107a for covering the sun roof portion 105 and a rear top 107b for covering the deck portion 106. The front top 107a is configured so as to be opened by a movable top bow mechanism 108 supported at both sides of the opening portion 104. This movable top bow mechanism 108 is made up of a panel support frame 109 supported by the roof portion 103 at both sides of the opening portion 104 and a top fixing panel 110 supported at the tip end portion of the panel support frame 109. The top 107 is installed to the movable top bow mechanism 108, for example, by connecting hooks 112 at the tip end portion of the front top 107a to engagement holes 111 formed on the back surface of the top fixing panel 110.

The rear top 107b, which covers the deck portion 106 of the luggage compartment, is spread by what is called a top bow frame 113. The top bow frame 113 is provided so as to extend toward the upper rear slantwise by being supported by a vehicle body 114 at both lower ends, and gives a tension to the rear top 107b by hooking up the inside surface of the rear top 107b.

Figure 13:
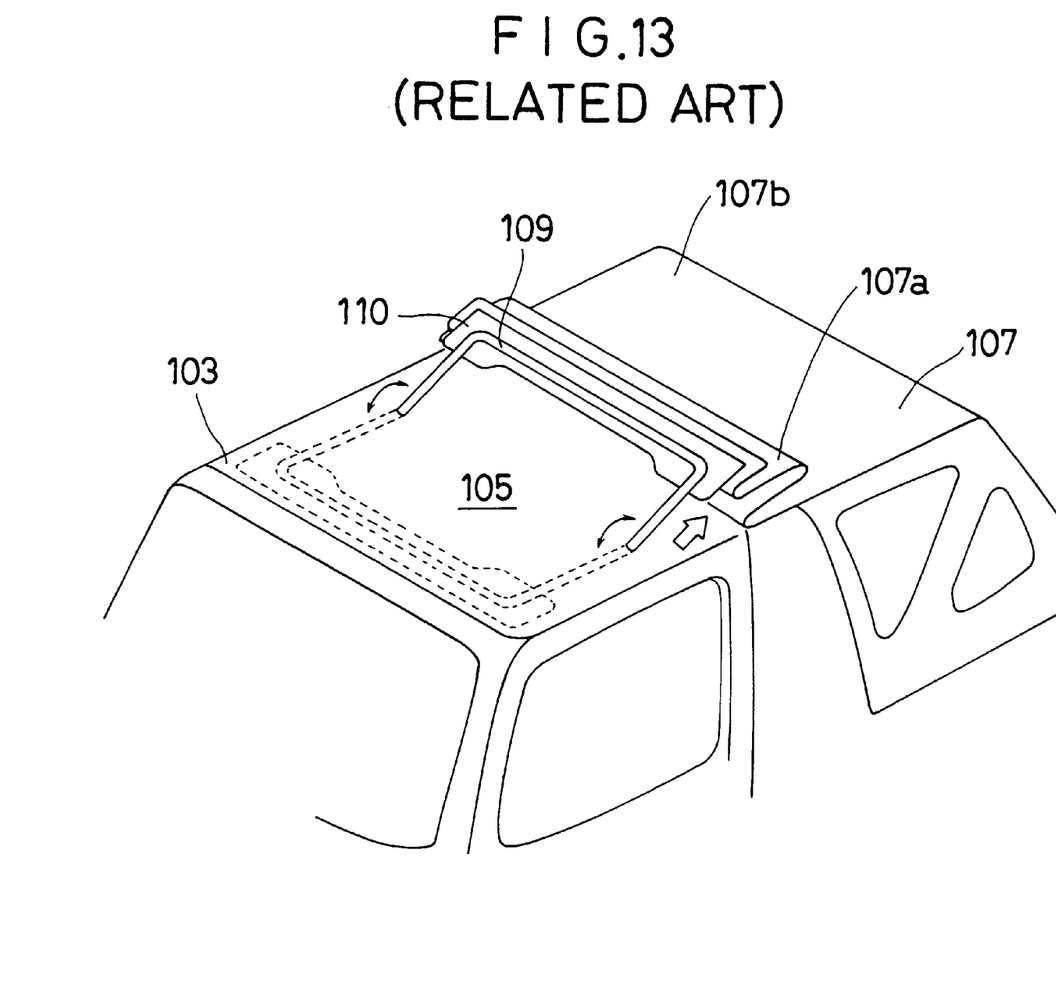
FIG. 13 is a perspective view showing a conventional automotive convertible top attaching construction in a state in which a top is open.

On the above-mentioned convertible automobile 100, when the front top 107a covering the sun roof portion 105 is opened, a lock is released and the panel support frame 109 is turned rearward. Then, the top fixing panel 110 is turned integrally as the panel support frame 109 turns, with the result that the front top 107a is opened as shown in FIG. 13. Thus, the outside air etc. are introduced from the sun roof portion 105. The top fixing panel 110 is fixed to a roof center pillar portion 115 which separates the sun roof portion 105 from the deck portion 106 of the luggage compartment 102.

Figure 14:
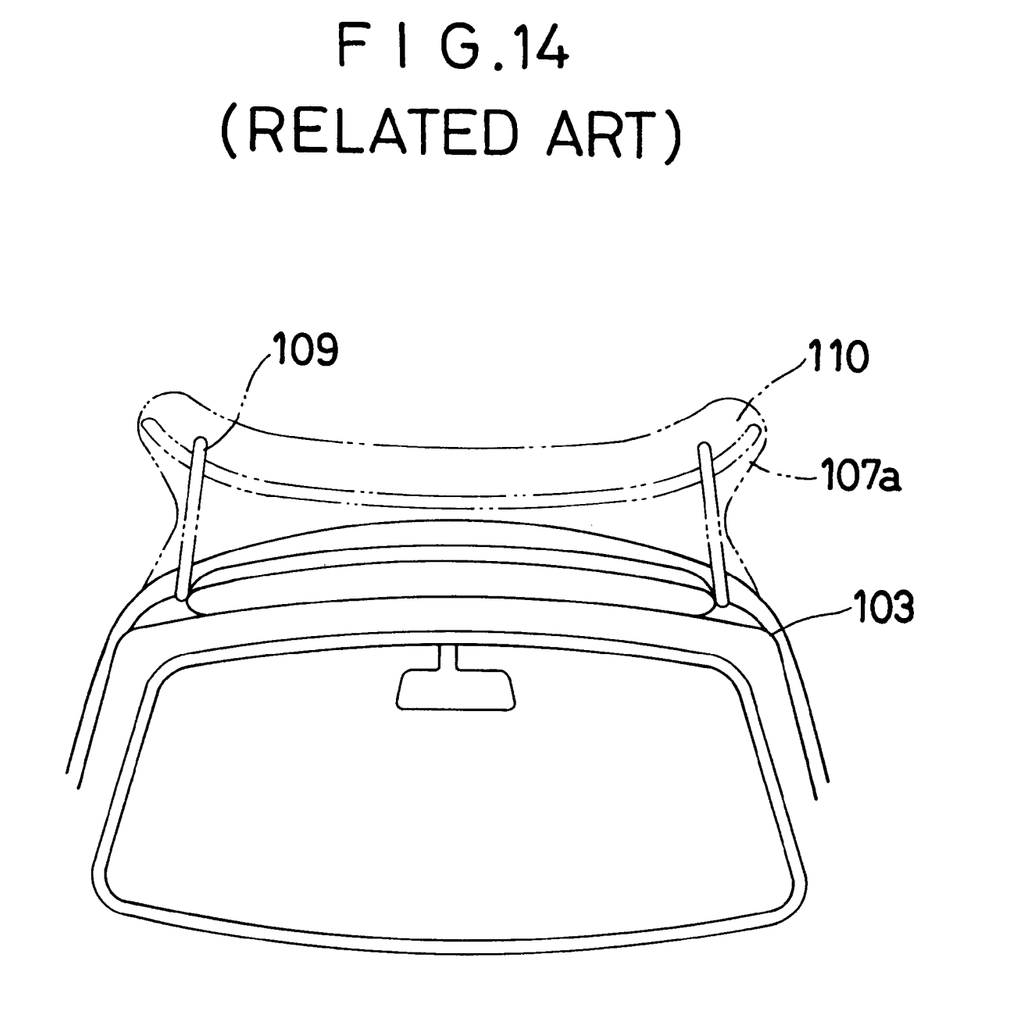
FIG. 14 is a schematic view showing a conventional automotive convertible top attaching construction in a state in which a top fixing panel is fixed when a front top is open.

However, when the panel support frame 109 is turned to open the front top 107a, the top fixing panel 110 is turned with the turning of the panel support frame 109, so that the back side of the top fixing panel 110 appears at the top as shown in FIG. 14. Because the top fixing panel 110 is formed into a curved surface along the roof portion 103, if the back side thereof faces upward, wind enters the folded front top 107a from the gap during the running of vehicle, which causes noise. Also, by the entrance of wind into the front top 107a portion, the top cloth is separated from the movable top bow mechanism 108, and the top cloth is easily subjected to an immoderate force. As the curvature of the roof portion 103 of the vehicle body decreases, that is, as the body is rounded more greatly, the total height of welded portion between the top fixing panel 110 and the panel support frame 109 increases when the sun roof portion 105 is opened by folding the front top 107a.

OBJECT AND SUMMARY OF THE INVENTION

The present invention was made to solve the above problems, and an object thereof is to provide an automotive convertible top attaching construction in which the entrance of wind into the folded top cloth can be prevented when a sun roof portion is open, so that the fluttering of top cloth can be reduced, and also the appearance can be improved.

To achieve the above object, the present invention provides an automotive convertible top attaching construction in which a roof is opened, and an open portion is covered with a top cloth, characterized in that the front end portion of the top cloth is mounted to a top fixing panel, a frame supporting the top fixing panel is pivotally mounted on both sides of the open portion rotatably in the longitudinal direction of vehicle body, and the top fixing panel is mounted to the frame rotatably with respect to the axis in the vehicle width direction.

Also, the present invention provides an automotive convertible top attaching construction in which an open portion is configured by being divided into a sun roof portion on the side of passenger compartment and a deck portion on the side of luggage compartment on opposite sides of a roof center pillar portion connecting center pillar portions, and the sun roof portion and deck portion are covered with a top cloth, characterized in that a frame is provided at both-side roof portion of the open portion composing the sun roof portion so that the base end portion thereof is pivotally mounted rotatably in the longitudinal direction of vehicle body, a top fixing panel to which the front end portion of top cloth is mounted is supported by the frame, and the top fixing panel is mounted to the frame rotatably with respect to the axis in the vehicle width direction.

Further, the present invention provides an automotive convertible top attaching construction in which an open portion is configured by being divided into a sun roof portion on the side of passenger compartment and a deck portion on the side of luggage compartment, and the sun roof portion and deck portion are covered with one top collectively, characterized in that a front top covering the sun roof portion is configured so as to be capable of being opened by a movable top bow mechanism, the movable top bow mechanism comprises a top fixing panel supporting the tip end portion of the front top, a panel support frame rotatably supporting the top fixing panel, and a panel support frame hinge rotatably supporting the panel support frame in the longitudinal direction of vehicle body, and the top fixing panel is rotatably supported by a frame portion between arm portions of the panel support frame via a pivot.

DETAILED DESCRIPTION OF PREFERRED EMBODIMENTS

An embodiment of the present invention will be described in detail with reference to the accompanying drawings.

Figure 1:
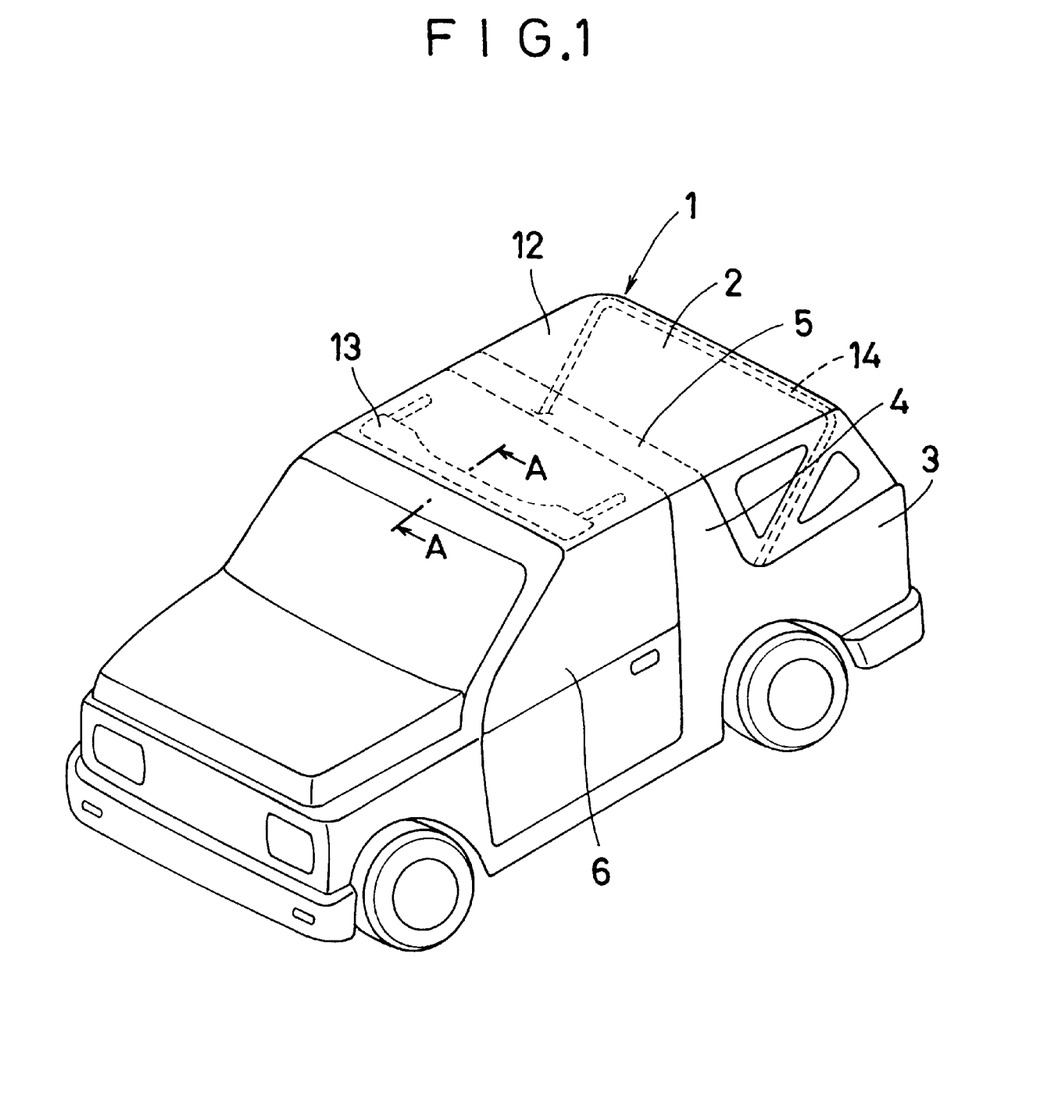
FIG. 1 is a perspective view showing an automotive convertible top attaching construction in accordance with an embodiment of the present invention.
Figure 2:
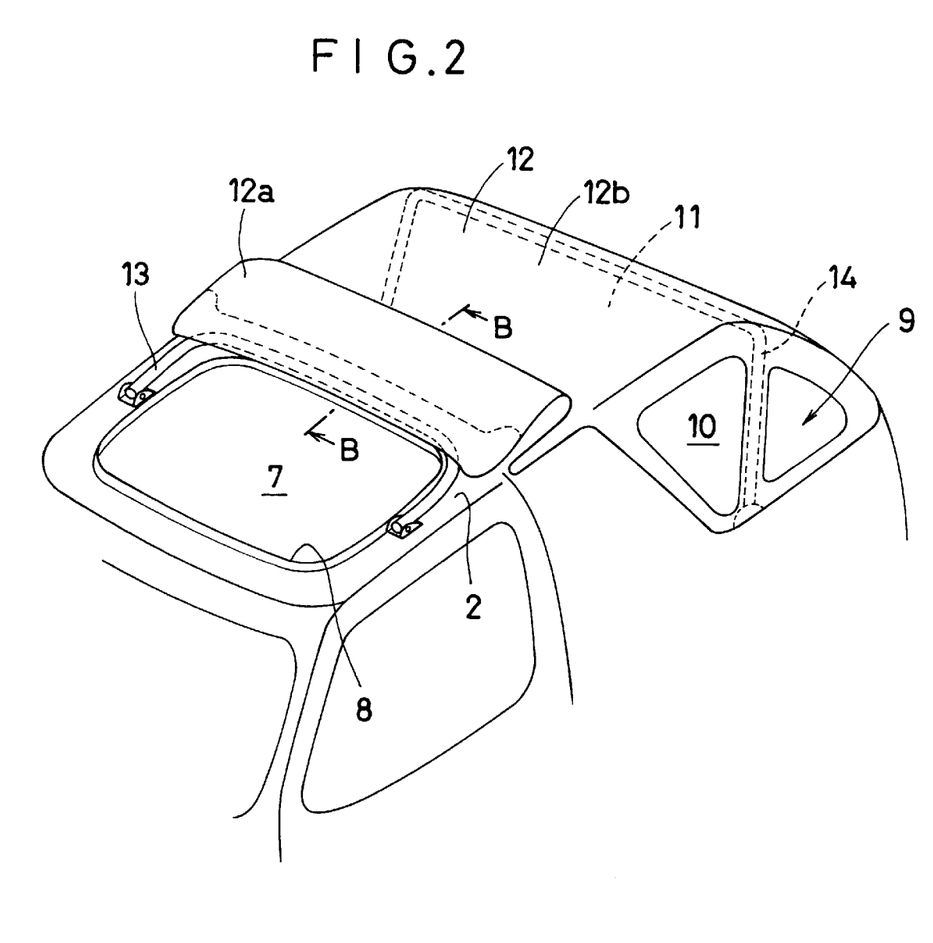
FIG. 2 is a perspective view showing a state in which a front top shown in FIG. 1 is open.

In FIGS. 1 and 2, reference numeral 1 denotes a convertible automobile. At a roof portion 2 of the convertible automobile 1, a roof center pillar portion 5 is provided to connect right and left center pillar portions 4 provided at the sides of a vehicle body 3. The roof portion 2 is provided with an opening portion 8 as a sun roof portion 7 in which a roof on the side of a passenger compartment 6 is open and an open portion 11 as a deck portion 10 on the side of a luggage compartment 9. In this case, the opening portion 8 at which the sun roof portion 7 is provided and the open portion 11 at which the deck portion 10 is provided are covered with a common top cloth 12 collectively.

The top cloth 12 is made up of a front top 12a supported by a movable top bow mechanism (also called a front top bow) 13 and a rear top 12b supported by a fixed top bow mechanism (also called a top bow) 14.

The movable top bow mechanism 13 will be described with reference to FIGS. 3 to 5.

Figure 3:
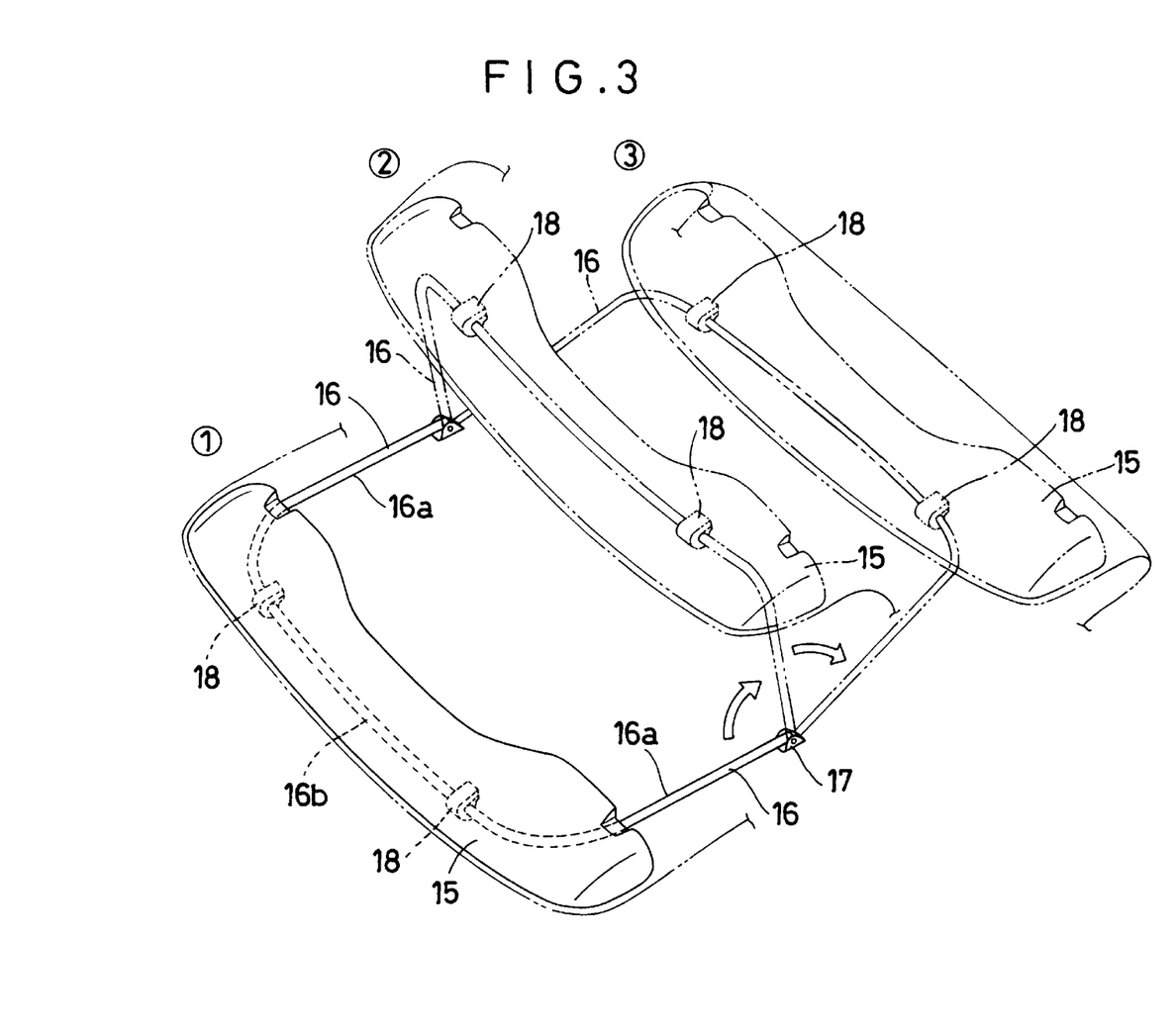
FIG. 3 is a perspective view showing a movement of a movable top bow mechanism shown in FIG. 2.

As shown in FIG. 3, the movable top bow mechanism 13 is made up of a top fixing panel (also called a front top bow panel) 15 supporting the tip end of the front top 12a, a panel support frame (also called a front top bow frame) 16 rotatably supporting the top fixing panel 15, and a panel support frame hinge (also called a front top bow frame hinge) 17 supporting the panel support frame 16 rotatably in the longitudinal direction of the vehicle body 3.

Figure 4:
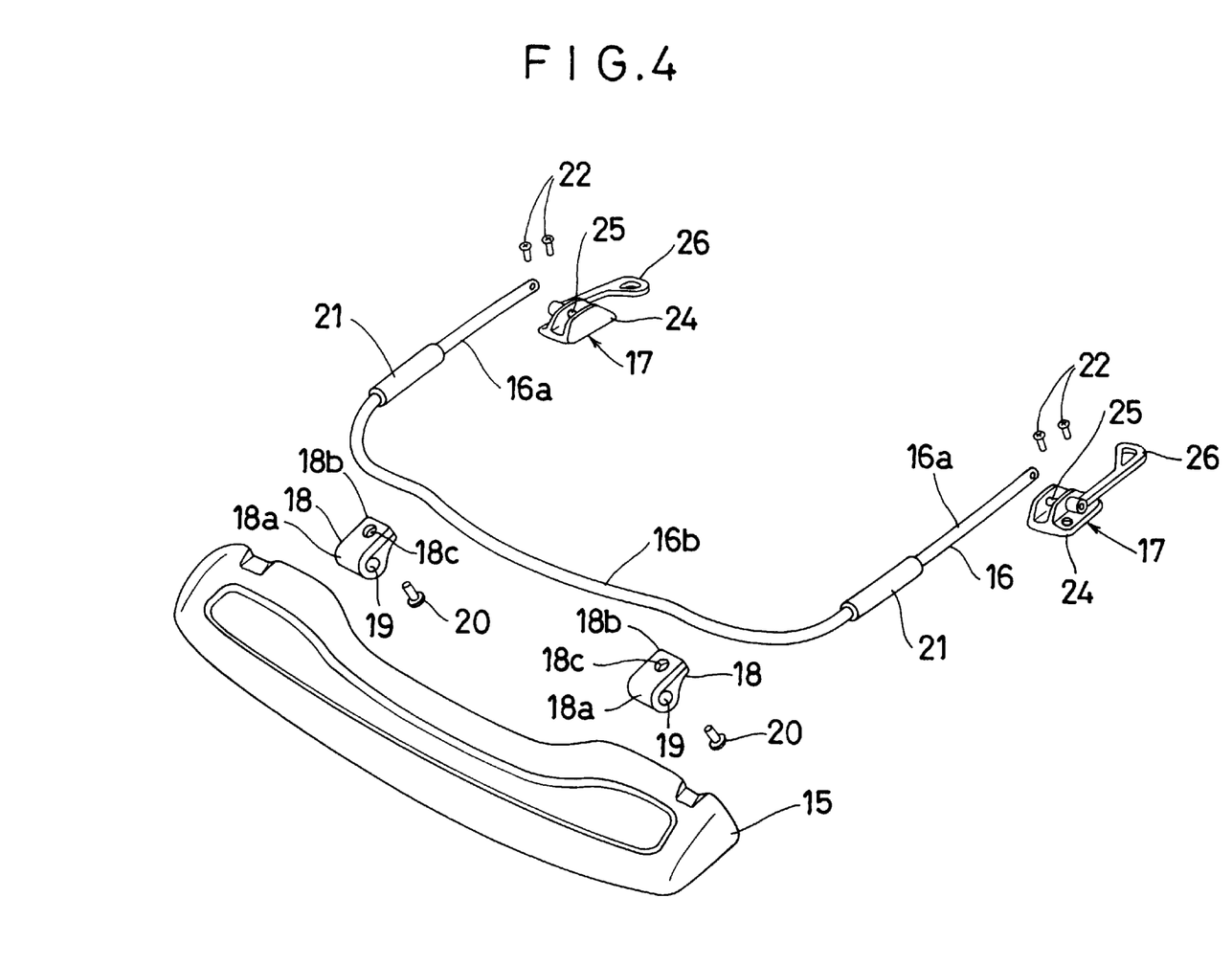
FIG. 4 is an exploded perspective view of a movable top bow mechanism.
Figure 5:
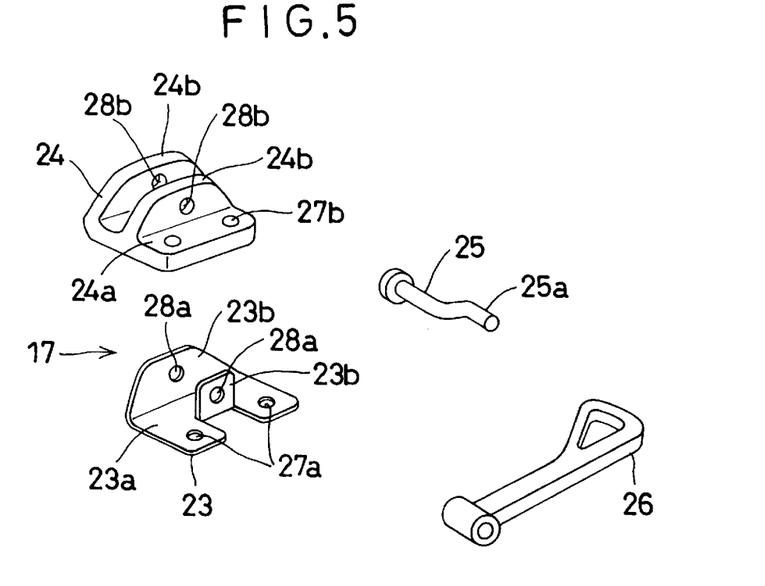
FIG. 5 is an exploded perspective view of a panel support frame hinge.

As shown in FIG. 4, the panel support frame 16 is formed by bending a frame such as a pipe into a substantially U shape, and the base end portions of arms 16a, 16a on both sides are supported by the panel support frame hinges 17. The top fixing panel 15 is supported by a frame portion 16b between the arm portions 16a, 16a of the panel support frame 16 via a pair of pivots 18. The pivot 18 is configured so that a plate made of, for example, a resin is bent into a twofold shape to form a semicircular attaching portion 19 on one side of the bent portion 18a, and a hole 18c is formed at a lapped tip end flange portion 18b. The attaching portion 19 of the pivot 18 is assembled to the frame portion 16b of the panel support frame 16, and the pivot 18 is threadedly engaged with the top fixing panel 15 by inserting a screw 20 into the hole 18c of the tip end flange portion 18b, by which the top fixing panel 15 is rotatably installed to the panel support frame 16. Protectors 21, which are mounted on the arm portions 16a, 16a, prevent contact noise produced by direct contact of the top fixing panel 15 with the panel support frame 16, for example, when the top fixing panel 15 is turned.

The panel support frame hinge 17, which is mounted to the roof portion 2 at each side of the opening portion 8, supports the base end portion of the panel support frame 16 rotatably in the longitudinal direction of the vehicle body 3. As shown in FIG. 5, the panel support frame hinge 17 is made up of a panel support frame hinge bracket 23 mounted to the roof portion 2 on each side of the opening portion 8 via screws 22, a panel support frame hinge cover 24 assembled to the panel support frame hinge bracket 23, a hinge pin 25 which is mounted to the panel support frame hinge bracket 23 to rotatably support the base end portion of the panel support frame 16, and a tension rod which is mounted to the hinge pin 25 to give a tension to the top cloth 12.

The panel support frame hinge bracket 23 and the panel support frame hinge cover 24 are provided with a pair of opposed plates 23b, 23b and 24b, 24b on the base plates 23a and 24a, respectively. The panel support frame hinge bracket 23 and the panel support frame hinge cover 24 are fixed to the roof portion 2 by inserting the screws 22 into screw holes 27a and 27b formed in the base plates 23a and 24a,respectively. The base end portion of the panel support frame 16 is rotatably assembled by inserting the hinge pin 25 into the holes 28a, 28a, and 28b, 28b formed in the plates 23b, 23b and 24b, 24b. The hinge pin 25 is provided with an extension portion 25a extending from one side of the plate 23b, 23b, 24b, 24b to the outside, whose axis is off-centered, and one end of the tension rod 26 is mounted on the extension portion 25a.

Figure 6:
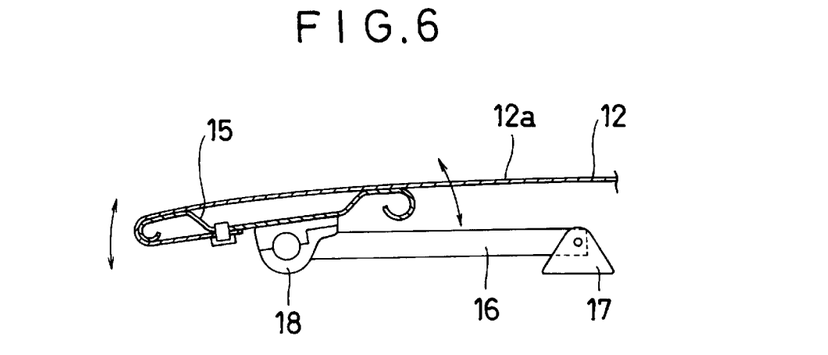
FIG. 6 is a sectional view taken along the line A—A of FIG. 1 showing a movable top bow mechanism in a state in which a front top is closed.
Figure 7:
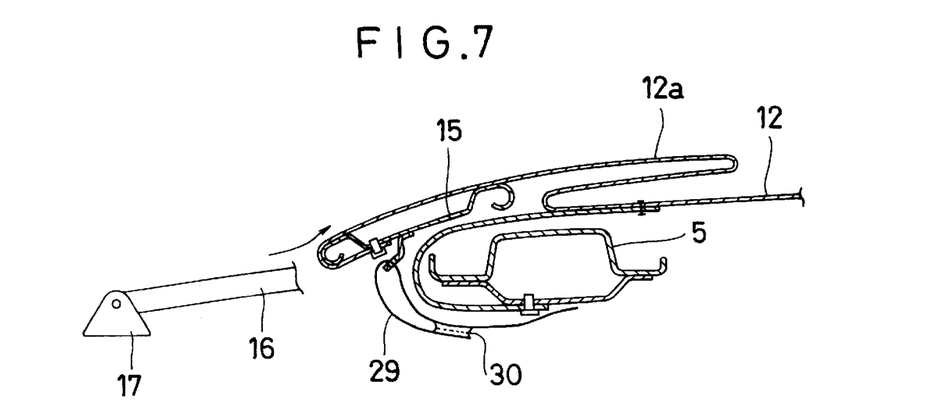
FIG. 7 is a sectional view taken along the line B—B of FIG. 2, showing a movable top bow mechanism in a state in which a front top is open.

The movable top bow mechanism 13 is kept in contact with the roof portion 2 by using a locking device, not shown, (see FIG. 6) and spreads the top cloth 12 when the front top 12a is closed. Also, it opens the sun roof portion 7 by opening the front top 12a. At this time, the top fixing panel 15 is fixed to the front end portion of the roof center pillar portion 5 by a belt 29 with the back surface thereof downward. One end of the belt 29, which has been fixed beforehand to the room side of the roof center pillar portion 5, is fastened by a surface fastener 30 and the like by passing the belt 29 through an attaching portion provided on the back surface of the top fixing panel 15 (see FIG. 7).

Figure 8:
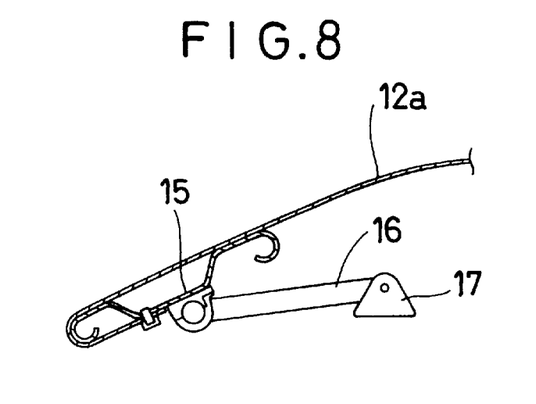
FIG. 8 is a sectional view showing a state in which a front top is closed.
Figure 9:
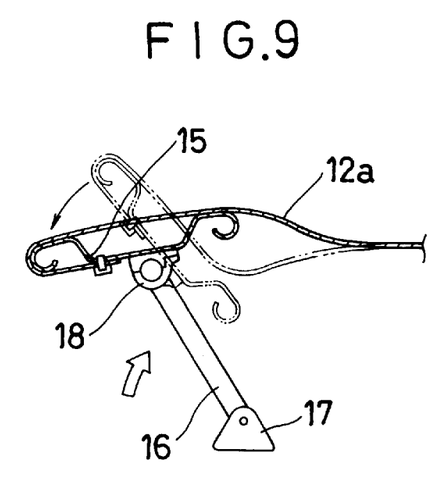
FIG. 9 is a sectional view showing an intermediate state during the time when a front top is opened.

Next, the operation of the present invention configured as described above will be described with reference to FIGS. 8 to 10.

Figure 10:
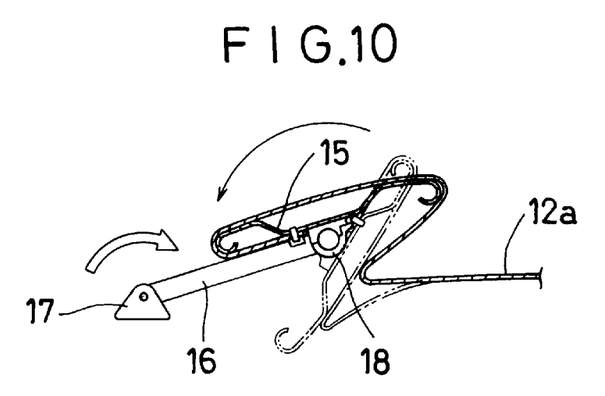
FIG. 10 is a sectional view showing a state in which a front top is open.

When the sun roof portion 7 is opened by opening the front top 12a, the locking mechanism for the movable top bow mechanism 13 is released, and the panel support frame 16 is turned to the rear of the vehicle body. At this time, the state of the top fixing panel 15 changes from the state shown in FIG. 8 to the state indicated by the two-dot chain line in FIG. 9 as the panel support frame 16 turns. The top fixing panel 15 is moved rearward while the upper surface faces upward by turning the top fixing panel 15 as indicated by the arrow in FIG. 9. Thereby, the top fixing panel 15 is moved to the rear of the vehicle body, and is moved to the roof center pillar portion 5. At this time, the top fixing panel 15 is moved as indicated by (1)–(2)–(3) in FIG. 3, and is moved in a state in which the upper surface of the top fixing panel 15 faces upward so that the pivots 18 are turned around the frame portion 16b of the panel support frame 16 in the direction opposite to the turning of the panel support frame 16. As shown in FIG. 10, the front top 12a is folded and fixed to the front end side of the roof center pillar portion 5 via the belt 29 etc. for fixing the top fixing panel 15.

According to the above configuration, since the top fixing panel 15 is fixed with the upper surface thereof facing upward when the front top 12a is open, wind is prevented from blowing in the front top 12a through a gap between the top fixing panel 15 and the roof center pillar portion 5 during the running of the vehicle, so that the noise caused by the flapping of the top cloth 12 during the running of the vehicle can be reduced. Also, since the top fixing panel 15 can be fixed to the front end side of the roof center pillar portion 5 via the belt 29 etc. for fixing the top fixing panel 15, the appearance can be improved, and the total height of the front top 12a can be kept low when the front top 12a is open.

The present invention is not limited to the above-described embodiment. Although the case where the sun roof portion 7 and the deck portion 10 on the side of the luggage compartment 9 are covered with a common top cloth 12 has been explained in this embodiment, the present invention can be applied to the case where the sun roof portion 7 and the deck portion 10 are covered with separate top cloths. Also, although the movable top bow mechanism 13 is configured by one panel support frame 16 in this embodiment, it may be configured by a plurality of panel support frames 16. Besides, needless to say, the configuration may be changed appropriately without departing from the gist of the present invention.

As described above, the automotive convertible top attaching construction in accordance with the present invention can achieve the effects described below.

In accordance with a preferred embodiment of the invention, there is provided an automotive convertible top attaching construction in which a roof is opened, and an open portion is covered with a top cloth, characterized in that the front end portion of the top cloth is mounted to a top fixing panel, a frame supporting the top fixing panel is pivotally mounted on both sides of the open portion rotatably in the longitudinal direction of vehicle body, and the top fixing panel is mounted to the frame rotatably with respect to the axis in the vehicle width direction. Therefore, the fluttering of top cloth can be prevented when a part of top cloth is open. Also, since the top can be opened without changing the direction of the top fixing panel, the gap between the top fixing panel and the vehicle body can be minimized, so that the entrance of wind into the room can be made a necessary minimum. Further, when the top fixing panel is fixed with the top open, the position of top fixing panel can be made lower than before, so that the appearance can be improved.

In accordance with a further preferred embodiment of the invention, there is provided an automotive convertible top attaching construction in which an open portion is configured by being divided into a sun roof portion on the side of passenger compartment and a deck portion on the side of luggage compartment on opposite sides of a roof center pillar portion connecting center pillar portions, and the sun roof portion and deck portion are covered with a top cloth, characterized in that a frame is provided at both-side roof portion of the open portion composing the sun roof portion so that the base end portion thereof is pivotally mounted rotatably in the longitudinal direction of vehicle body, a top fixing panel to which the front end portion of top cloth is mounted is supported by the frame, and the top fixing panel is mounted to the frame rotatably with respect to the axis in the vehicle width direction. Therefore, the fluttering of top cloth can be prevented when the top cloth provided at the sun roof portion. Also, since the top can be opened without changing the direction of the top fixing panel, the gap between the top fixing panel and the vehicle body can be minimized, so that the entrance of wind into the room can be made a necessary minimum. Further, when the top fixing panel is fixed with the top open, the position of top fixing panel can be made lower than before, so that the appearance can be improved.

In accordance with yet another preferred embodiment of the invention, there is provided an automotive convertible top attaching construction in which an open portion is configured by being divided into a sun roof portion on the side of passenger compartment and a deck portion on the side of luggage compartment, and the sun roof portion and deck portion are covered with one top collectively, characterized in that a front top covering the sun roof portion is configured so as to be capable of being opened by a movable top bow mechanism, the movable top bow mechanism comprises a top fixing panel supporting the tip end portion of the front top, a panel support frame rotatably supporting the top fixing panel, and a panel support frame hinge rotatably supporting the panel support frame in the longitudinal direction of vehicle body, and the top fixing panel is rotatably supported by a frame portion between arm portions of the panel support frame via a pivot. Therefore, the fluttering of top cloth can be prevented when the top cloth provided at the sun roof portion. Also, since the top can be opened without changing the direction of the top fixing panel, the gap between the top fixing panel and the vehicle body can be minimized, so that the entrance of wind into the room can be made a necessary minimum. Further, when the top fixing panel is fixed with the top open, the position of top fixing panel can be made lower than before, so that the appearance can be improved.

Preferably, a protector is mounted on the arm portion of the panel support frame. Therefore, contact noise produced by direct contact of the top fixing panel with the panel support frame can be prevented when the top fixing panel is turned.

What is claimed is:

1. An automotive convertible top attaching construction for attachment to a vehicle having a roof which is opened at an open portion thereof, and comprising:
   a top fixing panel;
   a top cloth adapted to cover the open portion, a front end portion of said top cloth being mounted to the top fixing panel;
   a panel support frame supporting said top fixing panel and adapted to be pivotally mounted to a body of the vehicle on both sides of said open portion such that the panel support frame is pivotally movable for rotatably moving the top fixing panel in the longitudinal direction of the vehicle body, the panel support frame comprising a transverse frame portion having opposed ends and a frame arm engaging each end, each frame arm extending from the transverse frame portion to be pivotally mounted to the vehicle body, such that the transverse frame portion is supported with respect to the vehicle body by only the frame arms; and said top fixing panel being mounted to said panel support frame so as to be rotatably movable with respect to the panel support frame about an axis which is oriented in the vehicle width direction.

2. An automotive convertible top attaching construction for attachment to a vehicle having an open portion which is divided into a sun roof portion over a passenger compartment and a deck portion over a luggage compartment, the sun roof portion and deck portion being located on opposite sides of a roof center pillar portion connecting center pillar portions of the vehicle, the vehicle including side roof portions on opposite sides of the open portion, and comprising:

a top fixing panel;

a top cloth having a front end portion mounted to the top fixing panel;

a panel support frame adapted to be mounted on the side roof portions of the open portion so that the panel support frame is rotatably movable in the longitudinal direction of vehicle, the panel support frame comprising a transverse frame portion having opposed ends and a frame arm engaging each end, each frame arm extending from the transverse frame portion to be pivotally mounted to the vehicle, such that the transverse frame portion is supported with respect to the vehicle by only the frame arms; and the top fixing panel being supported by said panel support frame such that said top fixing panel is rotatable relative to said panel support frame about an axis which is oriented in the vehicle width direction.

3. An automotive convertible top attaching construction for attachment to a vehicle having an open portion which is divided into a sun roof portion over a passenger compartment and a deck portion over a luggage compartment, and comprising:

a top adapted to cover both said sun roof portion and deck portion and including a front top adapted to cover said sun roof portion and being configured so as to be capable of being opened; and a movable top bow mechanism for opening said top, said movable top bow mechanism including a top fixing panel supporting a tip end portion of said front top and a panel support frame comprising a transverse frame portion having opposed ends and a frame arm engaging each end, each frame arm extending from the transverse frame portion to a panel support frame hinge adapted to be mounted on a body of the vehicle such that the transverse frame portion is supported with respect to the vehicle body by only the frame arms, the panel support frame hinge rotatably supporting said panel support frame such that said panel support frame is rotatably movable in the longitudinal direction of the vehicle body, and wherein said top fixing panel is rotatably supported by a pivot mounted on the transverse frame portion.

4. An automotive convertible top attaching construction according to claim 3 further comprising a protector mounted on each frame arm of said panel support frame.

* * * * *

UNITED STATES PATENT AND TRADEMARK OFFICE
CERTIFICATE OF CORRECTION

PATENT NO. : 6,206,450 B1
DATED : March 27, 2001
INVENTOR(S) : Ide et al.

It is certified that error appears in the above-identified patent and that said Letters Patent is hereby corrected as shown below:

<u>Title page,</u>
Item [73], Assignee, "Shizuoka-Ken" should read -- Hamamatsu --.
Item [57], ABSTRACT,
Line 10, "flattering" should read -- fluttering --.

Signed and Sealed this

First Day of October, 2002

Attest:

Attesting Officer

JAMES E. ROGAN
*Director of the United States Patent and Trademark Office*